Jan. 5, 1926.

M. HANSON

MOLD

Filed Jan. 28, 1925   2 Sheets-Sheet 1

1,568,601

Witness:

Inventor
Mandus Hanson
Cyrus W. Rice
Attorney

Jan. 5, 1926. 1,568,601
M. HANSON
MOLD
Filed Jan. 28, 1925  2 Sheets-Sheet 2

Patented Jan. 5, 1926.

1,568,601

UNITED STATES PATENT OFFICE.

MANDUS HANSON, OF MUSKEGON, MICHIGAN.

MOLD.

Application filed January 28, 1925. Serial No. 5,254.

*To all whom it may concern:*

Be it known that I, MANDUS HANSON, a citizen of the United States, residing at Muskegon, in the county of Muskegon and State of Michigan, have invented new and useful Improvements in Molds, of which the following is a specification.

The present invention relates to molds; and its object is to provide in connection with a mold (or molding "flask") improved means for guiding the parts thereof in their assembling and disassembling movements.

This and any other and more specific objects hereinafter appearing are attained by, and the invention finds preferable embodiment in, the structure hereinafter particularly described in the body of this specification and illustrated by the accompanying drawings, in which:—

Figure 1:
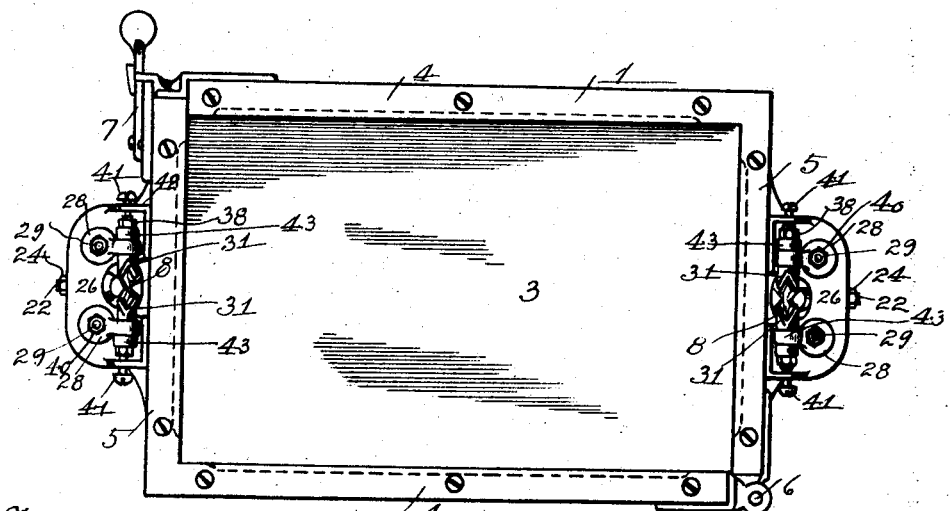
Figure 1 is a top plan view of a molding flask.
Figure 2:
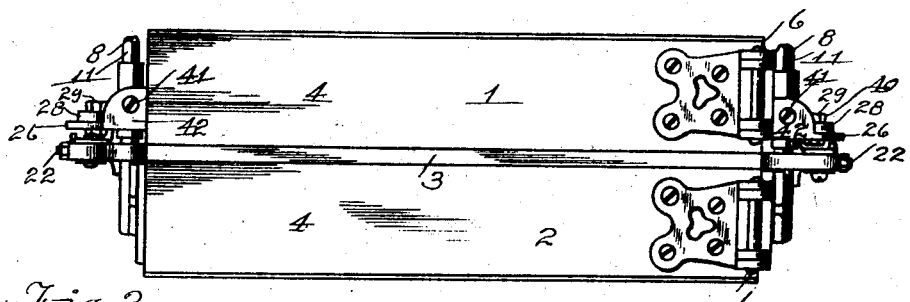
Figure 2 is a side view thereof.
Figure 3:
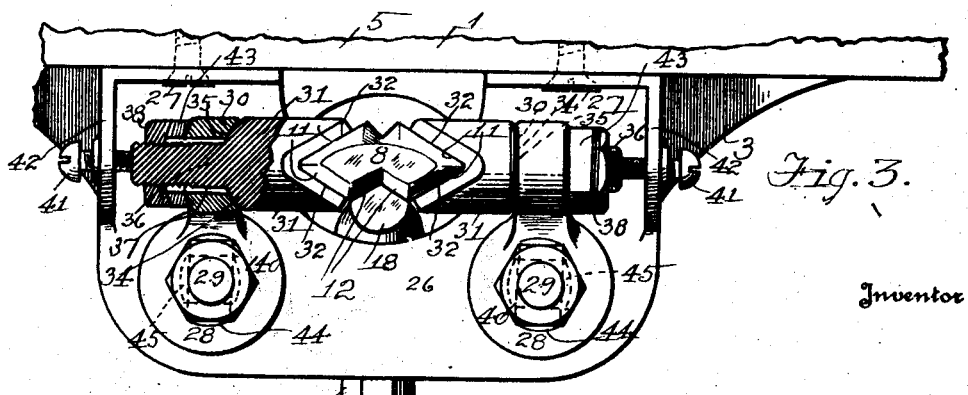
Figure 3 is a top plan view of the guiding means thereof, partially sectioned axially.
Figure 4:
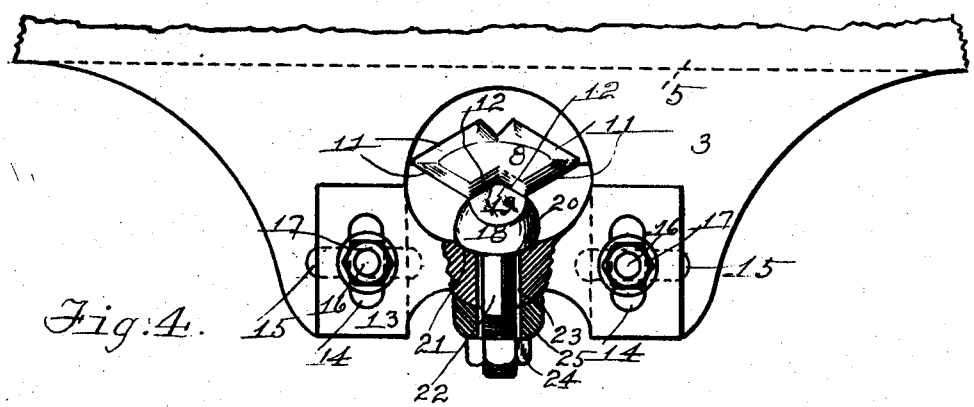
Figure 4 is a top plan view of a portion of said guiding means, partially sectioned axially.
Figure 5:
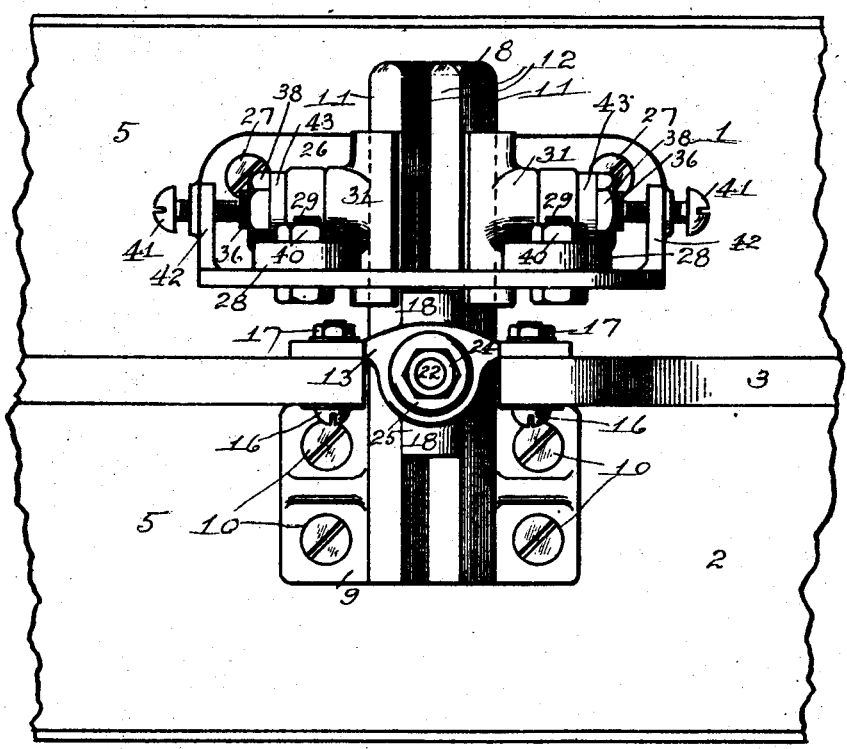
Figure 5 is a face view of said guiding means mounted on the end of the flask.

In the accompanying drawings, a mold or "flask" is shown comprising an upper part 1, a lower part 2 and an intermediate part (the separating plate) 3. Each of parts 1 and 2 comprises connected side walls 4 and end walls 5, one end wall and one side wall being hingedly connected at 6 and the other walls being detachably connected by the latch 7 in the usual manner as shown in Figures 1 and 2. The lower part or frame 2 carries at its opposite ends the upwardly extending guiding bars 8, these bars being provided with base flanges 9 secured to part 2 by screws 10. These bars have guiding surfaces 11 at their opposite side edges and other guiding surfaces 12 in their faces, the surfaces 11 being thus angularly disposed in a horizontal plane relatively to the surfaces 12, i. e., at approximately right angles thereto. The intermediate part 3, which separates parts 1 and 2 is provided at each end with a plate 13 movable in all horizontal directions by reason of its slots 14 being disposed at right angles to the slots 15 through the part 3, the connecting bolts 16 passing through both slots and being threaded to receive the nuts 17 whereby the plate may be secured or clamped in adjusted positions. A member 18 has a surface 19 slidably guided in the guiding surface 12 of the bar 8, in the assembling and disassembling movements of parts 2 and 3, and has a ball-portion 20 turnable in a ball-socket 21 in the plate 13. This member 18 has a shank 22 laterally movable in the opening 23 through the plate and threaded to receive the nut 24 whereby this member 18 may be clamped in desired turned position, with the concavo-convex washer 25 between the nut and plate.

The upper frame or part 1 carries at each end a plate 26 secured thereto as by screws 27. Socket-carrying blocks 28 are turnably mounted at 29 on this plate and have ball-sockets. Members 31 are slidably guided at their surfaces 32 on the oppositely-disposed guiding surfaces 11 of the bar 8, and have ball-portions 34 turnable in ball-sockets 35 in the blocks 28. These oppositely-disposed members 31 have shanks 36 extending through, and laterally movable in, openings 37 in the blocks and are threaded to receive nuts 38 whereby these members may be clamped on said blocks, the blocks having been turned about their pivotal mountings 29 to proper position. The turning down of the nuts 40 on said mountings 29 serves to hold these members 31 in proper adjustment; or said members may be held in adjustment by the screws 41 threaded in flanges 42 of the plate 26 and abutting on the outer ends of these members, and also adapted to swing the unclamped blocks 28 into proper position.

The concavo-convex washer 43 is shown clamped between the nut 38 and the block 28. These blocks 28 may be moved in all horizontal directions by reason of their slots 44 being disposed at right angles to the slots 45 through the plate 26, the bolts 29 passing through both slots.

It will be seen that the several members 18 and 31, slidably guided along the guiding bars 8, may be adjusted in every way relatively to these guiding bars. The plates 13 and the blocks 28 may be moved in every horizontal direction transversely to the bars 8; the blocks 28 may be swung on their pivotal mountings 29 to carry their ball-sockets 35 nearer to or farther from the guiding bars; and the members 18, 31 may be thus moved toward and away from said bars;

these members may be turned in the ball-sockets about the axes of said members and may be swung in all planes in which their axes lie.

It will also be seen that the members 18 slidingly contact the guiding bars at right angles to the contacting of the members 31 with these bars.

The invention being intended to be pointed out in the claims, is not to be limited to or by details of construction of the particular embodiment thereof illustrated by the drawings or hereinbefore described.

I claim:

1. In a mold: a part having parallelly disposed guiding bars; a part having pairs of members slidably guided on the opposite sides of the bars respectively and axially movable toward and away therefrom; means for moving and securing said members in adjusted positions.

2. In a mold: a part having parallelly disposed guiding bars; a part having pairs of members slidably guided on the opposite sides of the bars respectively and axially movable toward and away therefrom, and turnable about their axes; means for securing said members in adjusted positions.

3. In a mold: a part having parallelly disposed guiding bars; a part having pairs of members slidably guided on the opposite sides of the bars respectively and axially movable toward and away therefrom, and swingable in their axial planes; means for securing said members in adjusted positions.

4. In a mold: a part having parallelly disposed guiding bars; a part having pairs of members slidably guided on the opposite sides of the bars respectively and axially movable toward and away therefrom, and turnable about their axes and swingable in their axial planes; means for securing said members in adjusted positions.

5. In a mold: a part having parallelly disposed guiding bars; a part carrying pairs of oppositely disposed movable ball-sockets; pairs of members slidably guided on the opposite sides of the bars respectively and having ball-portions turnable in the respective pairs of ball-sockets; means for securing the ball-sockets in adjusted positions.

6. In a mold: a part having parallelly disposed guiding bars; a part carrying swingably mounted pairs of oppositely disposed ball-sockets; pairs of members slidably guided on the opposite sides of the bars respectively and having ball-portions turnable in the respective pairs of ball-sockets; means for securing the ball-sockets in adjusted swung positions.

7. In a mold: a part having parallelly disposed guiding bars; a part carrying pairs of oppositely disposed movable ball-sockets; pairs of members slidably guided on the opposite sides of the bars respectively and having ball-portions turnable in the respective pairs of ball-sockets; threaded means for securing said members in adjusted guided relation with the bars.

8. In a mold: a part having parallelly and oppositely disposed guiding bars; a part carrying a pair of members slidably guided on the bars respectively at their interrelatively opposite sides, and axially movable toward and away therefrom; means for moving and securing said members in adjusted positions.

9. In a mold: a part having parallelly and oppositely disposed guiding bars; a part carrying oppositely disposed movable ball-sockets; a pair of members slidably guided on the bars respectively at their interrelatively opposite sides and having ball-portions turnable in the ball-sockets respectively; means for securing the ball-sockets in adjusted positions.

10. In a mold: a part having parallelly and oppositely disposed guiding bars; a part carrying plates movable in interrelatively angular directions transverse to the bars and carrying oppositely disposed ball-sockets; a pair of members slidably guided on the bars respectively at their interrelatively opposite sides and having ball-portions turnable in the ball-sockets respectively; means for securing the plates in adjusted positions.

11. In a mold: a part having parallelly and oppositely disposed guiding bars; a part having pairs of members slidably guided on the opposite sides of the bars respectively; a part intermediate the aforesaid parts and carrying a pair of members slidably guided on the bars respectively at their interrelatively opposite sides which are angularly disposed relatively to their sides on which said members of the second-mentioned part are slidably guided; all said members being axially movable toward and away from the bars; means for securing said members in adjusted positions.

12. In a mold: a part having parallelly and oppositely disposed guiding bars; a part carrying pairs of oppositely disposed movable ball-sockets; pairs of members slidably guided on the opposite sides of the bars respectively and having ball-portions turnable in the respective pairs of ball-sockets; a part intermediate said parts and carrying oppositely disposed movable ball-sockets; a pair of members slidably guided on the bars respectively at their interrelatively opposite sides which are angularly disposed relatively to their sides on which said members of the second-mentioned part are slidably guided; means for securing the ball-sockets in adjusted positions.

13. A pair of detachably connected parts, one of which has a guiding bar and the other of which has a pair of members slidably guided on the opposite sides of the bar and axially movable toward and away therefrom, and means for moving and securing said members in adjusted positions.

14. A pair of detachably connected parts, one of which has a guiding bar and the other of which carries a movable ball-socket and a member slidably guided on the bar and having a ball-portion turnable in the ball-socket; means for securing the ball-socket in adjusted positions.

In testimony whereof I have hereunto set my hand at Grand Rapids, Michigan, this 22nd day of January, 1925.

MANDUS HANSON.